United States Patent
Eld et al.

(10) Patent No.: US 11,176,535 B2
(45) Date of Patent: Nov. 16, 2021

(54) LINKING PAYMENT TO SECURE DOWNLOADING OF APPLICATION DATA

(71) Applicant: FIDESMO AB, Spånga (SE)

(72) Inventors: Mattias Eld, Spånga (SE); Petter Arvidsson, Bromma (SE)

(73) Assignee: Fidesmo AB, Spanga (SE)

( * ) Notice: Subject to any disclaimer, the term of this patent is extended or adjusted under 35 U.S.C. 154(b) by 325 days.

(21) Appl. No.: 15/300,965

(22) PCT Filed: Mar. 30, 2015

(86) PCT No.: PCT/SE2015/050377
§ 371 (c)(1),
(2) Date: Sep. 30, 2016

(87) PCT Pub. No.: WO2015/152801
PCT Pub. Date: Oct. 8, 2015

(65) Prior Publication Data
US 2017/0032357 A1    Feb. 2, 2017

(30) Foreign Application Priority Data
Apr. 2, 2014 (SE) .................................. 1450395-7

(51) Int. Cl.
*G06Q 20/32*    (2012.01)
*H04W 12/47*    (2021.01)
(Continued)

(52) U.S. Cl.
CPC ....... *G06Q 20/3227* (2013.01); *G06Q 20/325* (2013.01); *H04W 12/06* (2013.01); *H04W 12/35* (2021.01); *H04W 12/47* (2021.01)

(58) Field of Classification Search
None
See application file for complete search history.

(56) References Cited

U.S. PATENT DOCUMENTS

| 5,724,520 A  * | 3/1998 | Goheen ................. G06Q 10/02 705/5 |
| 8,543,500 B2 * | 9/2013 | Ogilvy ................. G06Q 20/10 705/35 |

(Continued)

FOREIGN PATENT DOCUMENTS

| CN | 107993375 A * | 5/2018 |
| WO | 2008039796 A2 | 4/2008 |

(Continued)

OTHER PUBLICATIONS

Chang-Ying Zhou and Chun-Ru Zhan. "A Trusted Smart Phone and its Applications in Electronic Payment". Journal of Electronic Science and Technology of China. vol. 5, No. 3, pp. 206-211. (Sep. 2007) (Year: 2007).*

(Continued)

*Primary Examiner* — Ayal I. Sharon
(74) *Attorney, Agent, or Firm* — MKG, LLC

(57) ABSTRACT

A communication node for delivering secure content in respect of a requested service to a target entity. The communication node has respective interfaces towards: at least one network for communicating with mobile terminals; a service-provider node providing the requested service; and an authorization node for effecting payments. After having completed a set-up phase and in response to a payment, the communication node enables forwarding of secure content, relating to at least one service requested by a user of a first mobile terminal to a target entity associated with the first mobile terminal. The set-up phase involves: identifying the at least one requested service from the first mobile terminal; linking in the service-provider node the at least one requested service to the first mobile terminal; and assigning a reference in the service-provider node to a payment to be made in respect of the at least one requested service.

21 Claims, 2 Drawing Sheets

(51) Int. Cl.
*H04W 12/06* (2021.01)
*H04W 12/30* (2021.01)

(56) References Cited

U.S. PATENT DOCUMENTS

| | | | | |
|---|---|---|---|---|
| 9,853,921 B1* | 12/2017 | Saxena | ............. | H04L 51/12 |
| 2001/0034758 A1* | 10/2001 | Kikinis | ............. | H04L 12/2803 |
| | | | | 709/203 |
| 2001/0051996 A1* | 12/2001 | Cooper | ............. | G06Q 10/10 |
| | | | | 709/217 |
| 2002/0023015 A1* | 2/2002 | Hughes | ............. | G06Q 30/0633 |
| | | | | 705/26.8 |
| 2002/0035540 A1* | 3/2002 | Yamaguchi | ............. | G06Q 20/10 |
| | | | | 705/39 |
| 2002/0120564 A1* | 8/2002 | Strietzel | ............. | G06Q 20/102 |
| | | | | 705/40 |
| 2004/0030615 A1* | 2/2004 | Ling | ............. | G06Q 30/02 |
| | | | | 705/14.73 |
| 2004/0039651 A1* | 2/2004 | Grunzig | ............. | G06Q 20/00 |
| | | | | 705/26.1 |
| 2004/0128499 A1* | 7/2004 | Peterka | ............. | H04L 63/062 |
| | | | | 713/155 |
| 2004/0249768 A1* | 12/2004 | Kontio | ............. | G06Q 20/3674 |
| | | | | 705/65 |
| 2006/0080397 A1* | 4/2006 | Chene | ............. | H04L 67/00 |
| | | | | 709/213 |
| 2006/0165060 A1 | 7/2006 | Dua | | |
| 2006/0259927 A1* | 11/2006 | Acharya | ............. | H04N 7/17318 |
| | | | | 725/61 |
| 2007/0043667 A1* | 2/2007 | Qawami | ............. | G11B 20/00086 |
| | | | | 705/50 |
| 2007/0276926 A1* | 11/2007 | LaJoie | ............. | G06F 21/10 |
| | | | | 709/219 |
| 2008/0255890 A1* | 10/2008 | Hilliard | ............. | G06Q 30/0601 |
| | | | | 705/5 |
| 2009/0164322 A1 | 6/2009 | Khan et al. | | |
| 2010/0023531 A1* | 1/2010 | Brisebois | ............. | G06Q 10/10 |
| | | | | 707/E17.032 |
| 2010/0063930 A1* | 3/2010 | Kenedy | ............. | G06Q 30/02 |
| | | | | 705/51 |
| 2010/0138900 A1* | 6/2010 | Peterka | ............. | H04L 12/2812 |
| | | | | 726/4 |
| 2010/0169977 A1* | 7/2010 | Dasher | ............. | G06Q 20/3674 |
| | | | | 726/26 |
| 2010/0174974 A1* | 7/2010 | Brisebois | ............. | G06F 17/243 |
| | | | | 715/223 |
| 2010/0268649 A1* | 10/2010 | Roos | ............. | G06F 21/10 |
| | | | | 705/50 |
| 2011/0202393 A1* | 8/2011 | DeWakar | ............. | G06Q 20/102 |
| | | | | 705/13 |
| 2011/0225417 A1* | 9/2011 | Maharajh | ............. | H04L 65/4076 |
| | | | | 713/150 |
| 2012/0008786 A1* | 1/2012 | Cronk | ............. | H04L 63/102 |
| | | | | 380/282 |
| 2012/0113218 A1* | 5/2012 | Sasamoto | ............. | H04N 13/194 |
| | | | | 348/43 |
| 2013/0007849 A1* | 1/2013 | Coulter | ............. | G06F 21/10 |
| | | | | 726/4 |
| 2013/0035969 A1* | 2/2013 | Fisher | ............. | G06Q 30/0238 |
| | | | | 705/5 |
| 2013/0054473 A1* | 2/2013 | Jan | ............. | G06Q 20/40975 |
| | | | | 705/71 |
| 2013/0066776 A1* | 3/2013 | Rifaat | ............. | G06Q 20/202 |
| | | | | 705/41 |
| 2013/0080321 A1* | 3/2013 | Mulhall | ............. | G06Q 30/02 |
| | | | | 705/41 |
| 2013/0086375 A1* | 4/2013 | Lyne | ............. | G06Q 20/3227 |
| | | | | 713/153 |
| 2013/0127980 A1* | 5/2013 | Haddick | ............. | G06F 3/013 |
| | | | | 348/14.08 |
| 2013/0151400 A1* | 6/2013 | Makhotin | ............. | G06Q 20/3227 |
| | | | | 705/39 |
| 2013/0254106 A1 | 9/2013 | Webber et al. | | |
| 2013/0275307 A1* | 10/2013 | Khan | ............. | G06Q 20/40 |
| | | | | 705/64 |
| 2013/0305035 A1* | 11/2013 | Lyne | ............. | H04L 9/00 |
| | | | | 713/150 |
| 2013/0305333 A1* | 11/2013 | Katzer | ............. | H04W 4/80 |
| | | | | 726/7 |
| 2014/0039945 A1* | 2/2014 | Coady | ............. | G06Q 10/02 |
| | | | | 705/5 |
| 2014/0081854 A1 | 3/2014 | Sanchez et al. | | |
| 2014/0089113 A1 | 3/2014 | Desai et al. | | |
| 2014/0108263 A1* | 4/2014 | Ortiz | ............. | G06Q 20/3278 |
| | | | | 705/71 |
| 2014/0143089 A1* | 5/2014 | Campos | ............. | G06Q 20/20 |
| | | | | 705/26.8 |
| 2014/0143137 A1* | 5/2014 | Carlson | ............. | G06Q 20/02 |
| | | | | 705/39 |
| 2014/0214920 A1* | 7/2014 | Wong | ............. | H04L 51/04 |
| | | | | 709/203 |
| 2014/0256251 A1* | 9/2014 | Caceres | ............. | H04B 5/0031 |
| | | | | 455/41.1 |
| 2015/0033289 A1* | 1/2015 | Caceres | ............. | H04W 12/08 |
| | | | | 726/3 |
| 2015/0126109 A1* | 5/2015 | Keshavdas | ............. | H04B 5/0031 |
| | | | | 455/41.1 |
| 2015/0178712 A1* | 6/2015 | Angrish | ............. | G06Q 20/20 |
| | | | | 705/5 |
| 2015/0178862 A1* | 6/2015 | Angrish | ............. | G06Q 20/202 |
| | | | | 705/5 |
| 2015/0379499 A1* | 12/2015 | Wang | ............. | G06Q 10/109 |
| | | | | 705/42 |
| 2016/0063496 A1* | 3/2016 | Royyuru | ............. | H04L 9/3226 |
| | | | | 705/71 |

FOREIGN PATENT DOCUMENTS

| | | | | |
|---|---|---|---|---|
| WO | 2008039796 A3 | 4/2008 | | |
| WO | WO-2008039796 A2 * | 4/2008 | ............. | G06Q 20/322 |
| WO | 2010078530 A2 | 7/2010 | | |
| WO | WO-2010078530 A2 * | 7/2010 | ............. | G06Q 30/0232 |
| WO | 2012002852 A1 | 1/2012 | | |
| WO | 2013075071 A1 | 5/2013 | | |
| WO | WO-2014041381 A2 * | 3/2014 | ............. | G06Q 20/12 |

OTHER PUBLICATIONS

James Irwin. "Digital Rights Management: The Open Mobile Alliance DRM Specifications". Information Security Technical Report. vol. 9, No. 4, pp. 22-31. (Dec. 2004). https://doi.org/10.1016/S1363-4127(05)70037-6 (Year: 2004).*

Siddharth Bhatta, Radu Siona, and Bogdan Carbunarb. "A personal mobile DRM manager for smartphones". Computers & Security 28 (2009) pp. 327-340. (Year: 2009).*

Cameron Olsen. "Getting the most out of EMV with contactless cards". Card Technology Today, Apr. 2007. pp. 10-11. (Year: 2007).*

Yunli Cheng. "Based on netease train ticket booking system design and implementation". ISCME 2019. Journal of Physics: Conference Series 1486 (2020) 022006. IOP Publishing. doi:10.1088/1742-6596/1486/2/022006 (Year: 2019).*

English language translation of CN107993375A: https://patents.google.com/patent/CN107993375A/en?oq=CN+107993375+A (Year: 2017).*

GSMA Mobile Commerce, White Paper: The Role of the Trusted Service Manager in Mobile Commerce, Dec. 2013, pp. 1-11.

Globalplatform Inc., Messaging Specification for Management of Mobile-NFC Service, Version 1.1.2, Oct. 2013, pp. 1-425.

Extended European Search Report issued in corresponding European Application No. 15772482.4 dated Nov. 10, 2017, pp. 1-8.

Office Communication issued in corresponding European Patent Application No. 15772482.4, dated Nov. 26, 2019.

(56) References Cited

OTHER PUBLICATIONS

Third Office Action issued in corresponding Chinese Patent Application No. 201580017271.0, dated Oct. 8, 2019.

* cited by examiner

LINKING PAYMENT TO SECURE DOWNLOADING OF APPLICATION DATA

FIELD

The present invention relates generally to solutions for requesting, paying for and delivering service-related content to end-users. More particularly, the invention relates to a communication node, a mobile terminal and a method. The invention also relates to a computer program product and a computer readable medium.

BACKGROUND

Technical solutions are now being discussed as how to order and effect various services over communication networks in an efficient and user-friendly manner. The systems and standards that have been set so far mainly focus on pushing out content from the server side to mobile terminals and secure elements therein.

For example, US 2009/0164322 reveals a solution for (OTA) over-the-air provisioning of soft cards on devices with wireless communications capabilities. Further, the standard GlobalPlatform System, Messaging Specification for Management of Mobile-NFC Services v1.1.2, GPS_SPE_002, October 2013 defines technical functions and messages for live OTA management of mobile-NFC (Near Field Communication) services.

The known solutions, however, do not cover the full scenario. Namely, in most cases, the provision of content also entails an associated payment, or other authorization process; and there is yet no fully satisfying solution which, on one hand, fulfils the end-users' and the content providers' requirements with respect to safety/data integrity and, on the other hand, is efficient and user-friendly.

SUMMARY OF THE INVENTION

The object of the present invention is therefore to mitigate the above problem, and thus offer a simple and reliable means for unambiguously linking secure content to a payment, or other authorization event, in a mobile communication environment.

According to one aspect of the invention, the object is achieved by the initially described communication node, wherein after having completed a set-up phase and in response to a payment, the communication node is configured to enable forwarding of secure content relating to at least one service requested by a user of a first mobile terminal to a target entity associated with the first mobile terminal. The set-up phase involves identifying the at least one requested service from the first mobile terminal. The set-up phase further involves linking, in the service-provider node, the at least one requested service to the first mobile terminal; and assigning a reference in the service-provider node to a payment to be made in respect of the at least one requested service. The payment involves linking the at least one requested service and the first mobile terminal to a payment associated with the at least one requested service.

This communication node is advantageous because it links together the service request with the associated payment and the delivery of secure content very reliably. The procedure applied by the proposed communication node also renders it possible to initiate the transfer of secure content from the service-provider node before the payment has been completed. This, in turn, makes the overall process highly time efficient.

According to one preferred embodiment of this aspect of the invention, in the set-up phase, the communication node is configured to receive identification data from the first mobile terminal, which identification data designates the at least one requested service by means of a service identifier. In response to the identification data, the communication node is configured to send the service identifier to the service-provider node, which service identifier is based on the identification data. In the set-up phase, the communication node is further configured to receive a service description from the service-provider node, which service description is produced in response to the service identifier. Moreover, in the set-up phase, the communication node is further configured to send a message that is based on the service description together with a cart identifier to the first mobile terminal; and send a transaction identifier to the service-provider node. Here, the transaction identifier associates the first mobile terminal with a payment to be made in respect of the at least one requested service. This approach is advantageous because sending the transaction identifier to the service-provider node facilitates transferring secure content from the service-provider node to take place in parallel with the payment procedure.

According to another preferred embodiment of this aspect of the invention, the communication node is configured to effect the payment by sending a payment request to the authorization node. In response thereto, the authorization node is expected to issue a payment confirmation message. Upon receipt of such a message from the authorization node, the communication node is notified of a completed payment. Thereby, it is possible to forward any secure content to the first mobile terminal, which secure content may have been sent to the communication node in parallel with the payment procedure.

Preferably, the communication node is configured to enable the forwarding of secure content to the target entity (via the first mobile terminal) by receiving a service call from the service-provider node. The service call is issued in response to the transaction identifier from the communication node. Then, in response to the service call, the communication node sends a first operation identifier to the first mobile terminal, which first operation identifier associates the cart identifier to the transaction identifier. In response to the service call, the communication node also sends a second operation identifier to the service-provider node, which second operation identifier matches the first operation identifier (by e.g. being identical thereto). Via the service call, the secure content is sent from the service-provider node to the communication node. This node, in turn, then forwards the secure content in the form of at least one data message to the first mobile terminal. The at least one data message thus contains the secure content from the service-provider node. Typically, the secure content is divided into two or more data messages to the first mobile terminal, since this facilitates an efficient and flexible data transfer.

According to a further preferred embodiment of this aspect of the invention, after having forwarded the at least one data message to the first mobile terminal (i. e. completed the data transfer), the communication node is configured to receive at least one confirmation message from the first mobile terminal. Here, a final one of the at least one confirmation message indicates that the forwarding of the secure content to the first mobile terminal has been completed.

Then, in response to the final confirmation message, the communication node, in turn, preferably sends a general confirmation message to the service-provider node. The second confirmation message indicates that the forwarding of secure content to the first mobile terminal has been completed. Consequently, after having received the second confirmation message, the service-provider node can release the reference to the at least one service requested by the first mobile terminal, which was assigned in the set-up phase.

According to one preferred embodiment of this aspect of the invention, after having sent the second confirmation message, the communication node is configured to receive a service-complete confirmation message from the service-provider node. In response to the service-complete confirmation message, the communication node is configured to cancel the reference to the service-provider node relating to the at least one service requested by the first mobile terminal. Thereby, the resources reserved in the service-provider and communication nodes for delivering the secure content to the target entity can be released for use to other purposes.

According to another aspect of the invention, the object is achieved by the mobile terminal described initially, wherein the mobile terminal contains a wireless interface towards at least one network over which it may communicate with the above-proposed communication node. The mobile terminal is configured to, via the wireless interface and in response to specific user input, initiate a set-up phase regarding a service requested from a service-provider node. The mobile terminal is further configured to allow a user to effect a payment in respect of the requested service via an authorization node. After completed payment, the mobile terminal is also configured to receive secure content relating to the requested service from the communication node, for example via one or more data messages. Additionally, the mobile terminal contains a communication module configured to transfer the secure content to the associated target entity; either wirelessly to an external data carrier, or to a Secure Element in the mobile terminal 100, or by other means physically linked thereto, e.g. via a case. The advantages of this mobile terminal, as well as the preferred embodiments thereof, are apparent from the discussion above with reference to the proposed communication node.

According to still another aspect of the invention, the object is achieved by the method described initially, wherein, after having completed a set-up phase with respect to a first mobile terminal and in response to a thereto related payment, the method involves enabling forwarding of secure content relating to at least one service requested by a user of the first mobile terminal to a target entity, which is associated with the first mobile terminal. The set-up phase, in turn, involves: identifying the at least one requested service from the first mobile terminal; linking, in the service-provider node, the at least one requested service to the first mobile terminal; and assigning a reference in the service-provider node to a payment to be made in respect of the at least one requested service. The payment involves linking the at least one requested service and the first mobile terminal to a payment associated with the at least one requested service. The advantages of this method, as well as the preferred embodiments thereof, are likewise apparent from the discussion above with reference to the proposed communication node.

According to a further aspect of the invention the object is achieved by a computer program product, which is loadable into the memory of a computer, and includes software adapted to implement the method proposed above when said computer program product is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1A:
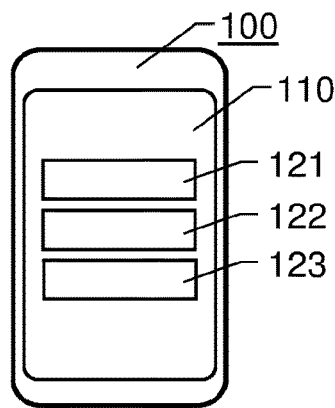
FIGS. 1a-1f illustrate how secure content may be downloaded to a mobile terminal and forwarded to a target entity according to one embodiment of the invention.
Figure 1B:
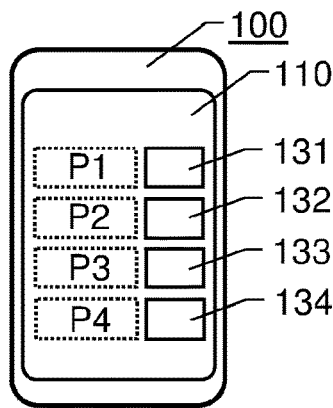
Figure 1C:
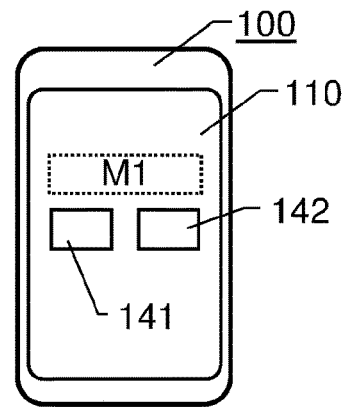
Figure 1D:
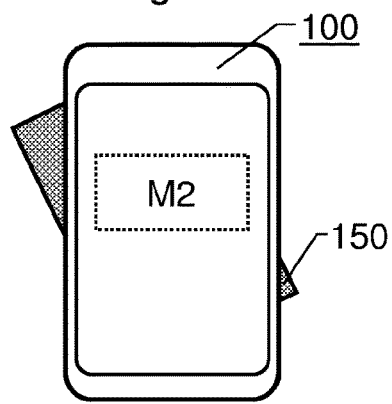
Figure 1E:
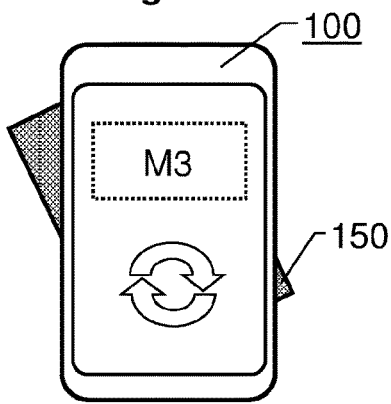
Figure 1F:
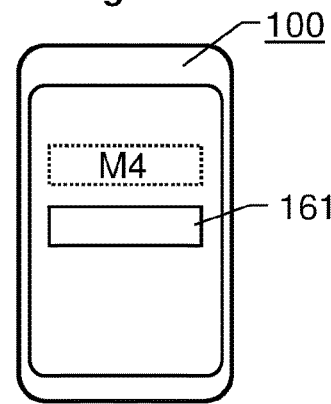

Initially, to explain from a user point-of-view how delivery of secure content may be effected according to the invention, we refer to FIGS. 1a to 1f. More precisely, FIGS. 1a to 1c illustrate how secure content in the form of ticket data is ordered from and forwarded to a mobile terminal 100. FIGS. 1d and 1e illustrate how the ticket data are loaded onto a target entity 150 (e.g. a contactless smartcard issued by a public transportation operator (PTO)), and FIG. 1f illustrates a subsequent confirmation step.

The mobile terminal 100 is preferably a so-called smartphone with at least one wireless interface towards a network N (e.g. the Internet) via which a communication node SECS (see FIG. 2) can be reached. The mobile terminal 100 may further be provided with a short-range radio transceiver configured to communicate with other devices by bringing the mobile terminal 100 proximate thereto. Hence, the mobile terminal 100 may include an NFC interface. Alternatively, or as a complement, the mobile terminal 100 may contain at least one interface configured to communicate according to the Bluetooth and/or BLE (Bluetooth Low Energy) standards. Moreover, the mobile terminal 100 may contain the target entity 150 in the form of a Secure Element in a SIM (Subscriber Identity Module). As yet another alternative, a protective case for the mobile terminal 100 may include such a Secure Element, which is physically linked to the mobile terminal 100, and/or the mobile terminal 100 may be associated with a Secure Element in the form of a USB (Universal Serial Bus) memory stick representing the target entity 150.

FIG. 1a shows the mobile terminal 100 in which software (e.g. a so-called app) associated with said PTO is running. The software may have been downloaded directly from the PTO, or from a general software provider, such as App Store™ or GooglePlay™. Via a display 110 in the mobile terminal 100, the software presents a first set of options to a user, for instance 121: "Select route maps", 122: "Plan your route" and 123: "Purchase tickets." In this case, we assume that the user wishes to purchase a ticket and therefore selects the option 123.

As a result, the software presents another menu, which is illustrated in FIG. 1b. Here, the display 110 presents a second set of options in the form of different types of tickets, for example a first option P1: "Single trip $1.50" and an associated selection button 131; a second option P2: "Day pass $5.00" and an associated selection button 132; a third option P3: "10 trips $10.00" and an associated selection button 133; and a fourth option P4: "Week pass $25.00" and an associated selection button 134. Let us assume that the user activates the selection button 132, and thus chooses the second option P2.

This causes the display 110 to present a first message M1 reading "You have requested to purchase a day pass ticket at the price $5.00" and two accompanying on-screen buttons, namely a first button 141 for cancelling this choice, and a second button 142 for confirming purchase of the selected ticket as illustrated in FIG. 1c. Provided that the user activates the second button 142, payment is thereafter effected. This either means that money is withdrawn from an earlier registered debit/credit card, or that the display 110 presents a menu via which the user can enter relevant payment data, such as identifying a debit/credit-card. In any case, the software causes payment approval (i.e. authorization) to be obtained from a payments provider and requests ticket data from the PTO.

Subsequently, as illustrated in FIG. 1d, a second message M2 on the display 110 prompts the user to position the mobile terminal 100 over the target entity 150. Preferably, as soon as the short-range radio interface detects the target entity 150 (i.e. here the contactless smartcard), the software initiates a transfer of the requested ticket data onto the target entity 150, and a third message M3 on the display 110 informs the user accordingly.

Figure 2:
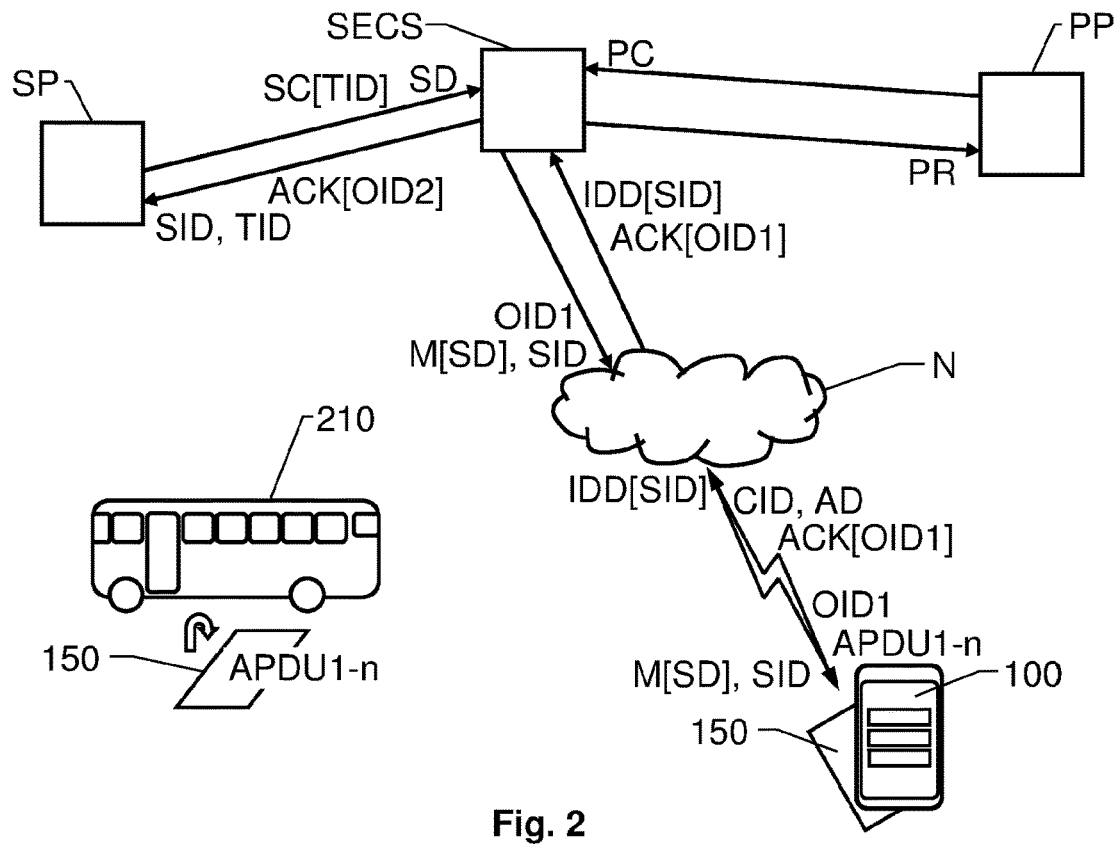
FIG. 2 shows a block diagram over a communication system in which the proposed communication node and mobile terminal are included.

When the transfer is complete, a fourth message M4 on the display 110 notifies the user that the target entity 150 now contains the requested ticket data APDU1-$n$, and that the target entity 150 is ready for use in the PTO's public transportation system, for example to pay for a ride in an autobus 210 (see FIG. 2).

Referring to the communication system in FIG. 2, we will now explain how the proposed communication node SECS effects delivery of and provides payment for secure content APDU1-$n$ to the target entity 150.\

In addition to the communication node SECS, the communication system includes a service-provider node SP and an authorization node PP. The service-provider node SP is configured to provide at least one service, which is possible to request from a mobile terminal 100, such as the ticket data described above. The authorization node PP is configured to effect payments, or similar authorization-based services. The communication system further includes at least one network N (e.g. of cellular or WiFi type) via which the mobile terminal 100 may reach the communication node SECS. The communication node SECS has a first interface towards the at least one network N, a second interface for communication with a service-provider node SP, and a third interface for communication with the authorization node PP.

As will be explained in detail below with reference to FIG. 3, secure content SC[TID] is ordered from, paid for and delivered to the mobile terminal 100 via a procedure that involves first, second and third phases 310, 320 and 330 respectively.

In the first phase 310, a user of the mobile terminal 100 sets up a connection to the communication node SECS, wherein at least one requested service is identified IDD[SID], which at least one service is associated with secure content SC[TID] from the service-provider node SP. The set-up phase 310 links SID the at least one requested service to the mobile terminal 100 and assigns a reference TID in the service-provider node SP to a payment to be made in respect of said service.

The payment, which is effected in the second phase 320, may be initiated as soon as said message M[SD] which is based on the service description SD has been sent to the mobile terminal 100. The payment involves linking CID the at least one requested service and the first mobile terminal 100 to a particular payment. This payment, in turn, is executed via an authorization message AD from the mobile terminal 100 to communication node SECS, which authorization message AD includes said link CID; a message PR from the communication node SECS to the authorization node PP; and a return message PC in the opposite direction confirming the payment.

In the third phase 330, the secure content SC[TID] is sent from the service-provider node SP to the communication node SECS, and then forwarded to the mobile terminal 100; preferably via a set of data messages APDU1-$n$. According to an embodiment of the invention, the third phase 330 entails sending operation identifiers OID1 and OID2 to the mobile terminal 100 and the service-provider node SP respectively from the communication node SECS. Then, at least one data message APDU1 to APDUn is sent from the communication node SECS to the mobile terminal 100, and forwarded to the target entity 150. Preferably, in response to each data APDU1 to APDUn message, the mobile terminal 100 returns a respective acknowledgement message ACK[1] to ACK[n] to the communication node SECS.

In response to a final confirmation message ACK[n] thereof, the communication node SECS preferably sends a general confirmation message ACK[OID2] to the service-provider node SP. Finally, the service-provider node SP may cancel the reference TID to the requested service and send a service-complete confirmation message END[TID] to the communication node SECS to establish an end of the procedure.

It is advantageous if the communication node SECS includes, or is in communicative connection with a memory unit storing a computer program product, which contains software for causing the communication node SECS to perform the above-described actions when the computer program product is run on one or more processors in the communication node SECS.

Figure 3:
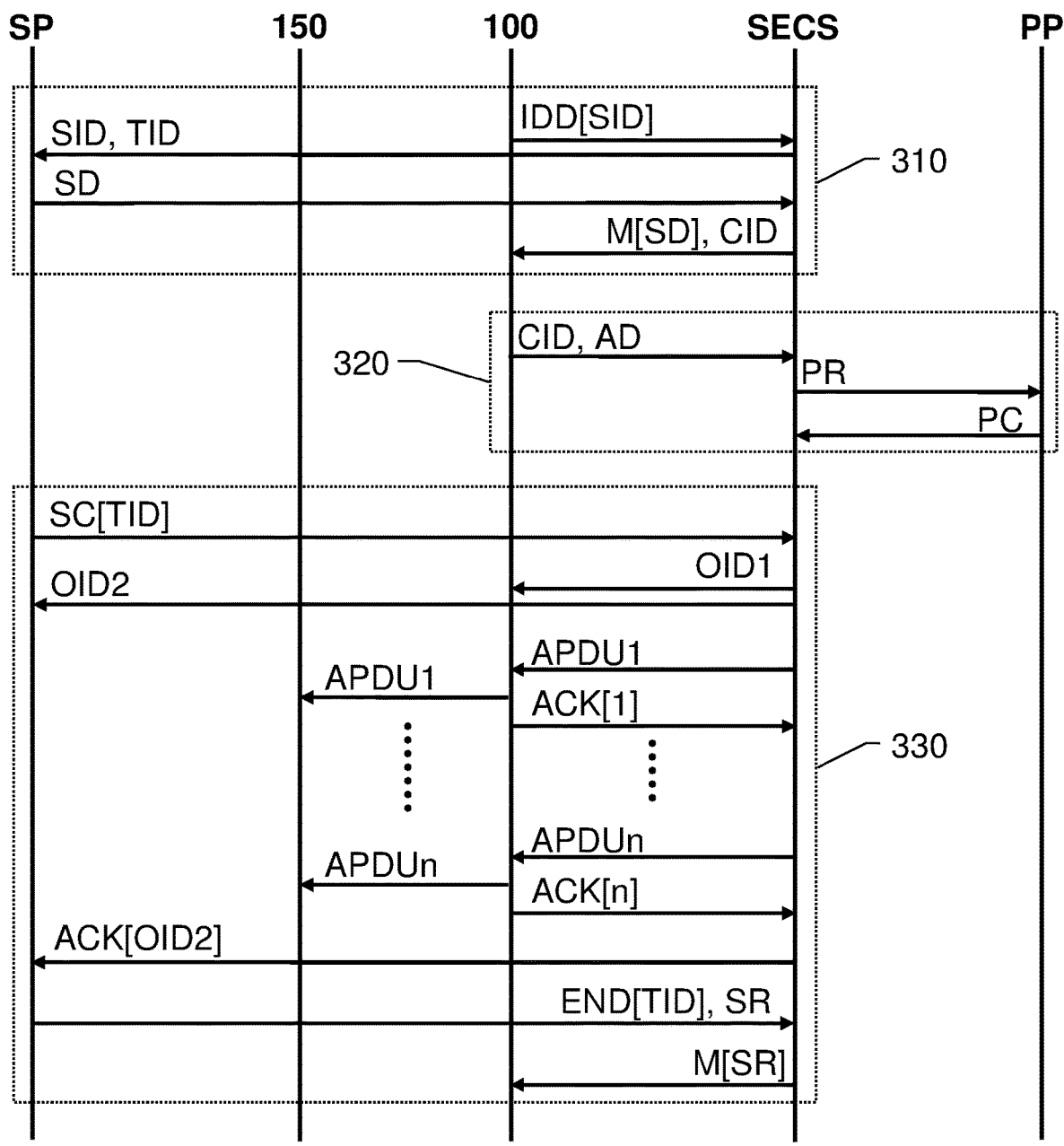
FIG. 3 illustrates, by means of an example, how messages and data may be sent according to the invention between a mobile terminal and the nodes in the communication system of FIG. 2.

To sum up, and with reference to the diagram in FIG. 3, we will now describe a method according to an embodiment of the invention that is performed in the communication node SECS in connection with delivering secure content SC[TID] in respect of a requested service to a target entity 150 associated with a mobile terminal 100. The method contains a set-up phase, a payment phase 320 and a delivery phase 330.

In a first step of the set-up phase 310, a mobile terminal 100 identifies, via identification data IDD[SID] to the communication node SECS, at least one requested service (e.g. secure content in the form of ticket data) offered by the service-provider node SP. In practice, the identification data IDD[SID] may be generated in response to a user activating the selection button 132 in FIG. 1b. The identification data IDD[SID] contains a service identifier SID linking the service-provider node SP to the at least one requested service and the mobile terminal 100 by assigning a reference TID in the form of a transaction identifier in the service-provider node SP to a payment 320 to be made for the at least one requested service.

In a second step of the set-up phase 310, the communication node SECS sends the service identifier SID and the transaction identifier TID to the service-provider node SP. In a third step of the set-up phase 310, and in response to the service identifier SID, the service-provider node SP sends a service description SD to the communication node SECS.

In a fourth step of the set-up phase 310, the communication node SECS sends a message M[SD] that is based on the service description SD together with a cart identifier CID to the first mobile terminal 100. Thus, the message M[SD] may be presented as the above-described message M1 in the mobile terminal 100 (see FIG. 1c). Thus, the at least one requested service is linked to the payment 320 to be made in response to a command from the mobile terminal 100.

In a first step of the payment phase 320, the user of the mobile terminal 100 authorizes payment for the at least one requested service by sending authentication data AD, which are linked to the cart identifier CID, to the communication node SECS. This node, in turn, effects the payment by, in a second step of the payment phase 320, sending a payment request PR to the authorization node PP. Provided that the user is found to be authorized and disposes sufficient funds, in response to the payment request PR the authorization node PP sends a payment confirmation message PC to the communication node SECS, and thus completes the payment phase 320.

The delivery phase 330 may be initiated as soon as the service-provider node SP has received the service identifier SID and the transaction identifier TID, i.e. after the second step of the set-up phase 310. However, of course, the secure content SC[TID] (or more precisely APDU1 to APDUn) cannot be made available to a user of the mobile terminal 100 before the payment phase 320 has been completed successfully.

In a first step of the delivery phase 330, the service-provider node SP issues a service call SC[TID] to the communication node SECS, which service call SC[TID] causes the secure content to be sent to the communication node SECS and contains the reference in the form of a transaction identifier TID. In response to the service call SC[TID], in a second step of the delivery phase 330, the communication node SECS sends a first operation identifier OID1 to the first mobile terminal 100. The first operation identifier OID1 associates the cart identifier CID to the transaction identifier TID. In a third step of the delivery phase 330, the communication node SECS sends a second operation identifier OID2 to the service-provider node SP. The second operation identifier OID2 matches the first operation identifier OID1. This means that the second operation identifier OID2 can be derived from the first operation identifier OID1, and vice versa. Naturally, for example, the first and second operation identifiers OID1 and OID2 may be equal/identical.

The communication node SECS, in turn, is configured to enable the forwarding of secure content SC[TID] to the mobile terminal 100 at any time after that this data reaches it. Preferably, the communication node SECS forwards the secure content SC[TID] to the mobile terminal 100 in the form of one or more data messages, for example so-called application data units, APDU1, . . . , APDUn, which each contains a portion of the secure content SC[TID].

After having received each data message APDU1, . . . , APDUn correctly in the mobile terminal 100, the mobile terminal 100 preferably returns a respective confirmation message ACK[1], . . . , ACK[n] to the communication node SECS. In response to having received a final confirmation message ACK[n] indicating that the entire secure content SC[TID] has been received correctly in the mobile terminal 100, the communication node SECS preferably sends a general confirmation message ACK [OID2] to the service-provider node SP. The general confirmation message ACK [OID2] specifies to the service-provider node SP that the forwarding of secure content SC[TID] to the mobile terminal 100 has been successful. At this point, the service-provider node SP may set up another secure-content sequence, i.e. issue a new SC[TID], or send a service-complete message indicating for the communication node SECS that the forwarding of secure content SC[TID] to the mobile terminal 100 has been completed. Thus, the delivery phase 330 ends. The service-complete message END[TID] may be associated with a service result SR specifying an effect of the fact that the secure content has been transferred. It is further preferable if the communication node SECS is configured to forward a message M[SR] based on the service result SR to the mobile terminal 100. Namely, based on such a message M[SR], in turn, the mobile terminal 100 may present adequate information to the user (cf. the above-described message M4 notifying the user that the transfer of the requested secure content has been completed).

It is worth noting that, according to the invention, a single transaction identifier TID is always associated with a single service call SC[TID] via which the secure content is transferred to the communication node SECS. Nevertheless, as illustrated above, the secure content SC[TID] may be divided into two or more pieces. Consequently, the mobile terminal 100 may issue multiple confirmation messages ACK[1] to ACK[n] before the communication node SECS returns the general confirmation message ACK [OID2] indicating the all pieces of secure content SC[TID] have been transferred.

The above-described process steps, as well as any sub-sequence of steps, may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

What is claimed is:

1. A non-transitory computer readable medium storing a program, the program for causing a first processor to establish a communication node on a first computer for delivering service-related secure content of a requested service to a target entity, the communication node configured by the first processor to:
   establish a first communication link directly between the communication node of the first computer and at least one network for direct communication with a plurality of mobile terminals connected to the at least one network;
   establish a second communication link directly between the communication node of the first computer and a service-provider node, the service-provider node established by a second processor on a second computer connected to the at least one network, the service-provider node configured by the second processor to provide the service-related secured content of the requested service by directly interacting with the communication node in a delivery phase; and
   establish a third communication link directly between the communication node of the first computer and an authorization node, the authorization node established by a third processor on a third computer connected to the at least one network, the authorization node configured by the third processor to effect payments and confirm completion of payment by directly interacting with the communication node in a payment phase;
   wherein, after having completed a set-up phase and in parallel with the payment phase, the communication node is further configured by the first processor to initiate the delivery phase for forwarding the service-related secure content of at least one requested service selected by a user of a first mobile terminal of the plurality of mobile terminals from the service-provider node directly to the communication node, and after having completed the payment phase, from the communication node to a target entity via the first mobile terminal to complete the delivery phase; and
   the set-up phase comprising:
      identifying, by the first mobile terminal to the communication node, the at least one requested service;
      designating, by the communication node, the service-provider node to provide the at least one requested service to the first mobile terminal;
      assigning, by the communication node, a transaction identifier in the service-provider node related to a payment to be received for the at least one requested service; and
      assigning, by the communication node, a cart identifier in the first mobile terminal linking the at least one requested service and the first mobile terminal to the payment to be provided for the at least one requested service;
   wherein the service-related secure content is comprised of ticket data ordered from and forwarded to at least one of the plurality of mobile terminals; and
   wherein the target entity is comprised of a contactless smartcard issued by a public transportation operator.

2. The non-transitory computer readable medium according to claim 1, wherein, in the set-up phase, the communication node is further configured by the first processor to:
   receive identification data from the first mobile terminal, and use the identification data to designate the at least one requested service by a service identifier; and
   in response to receipt of the identification data:
      send the service identifier to the service-provider node, the service identifier being based on the identification data;
      receive a service description from the service-provider node, the service description being produced in response to the service identifier;
      send a message based on the service description together with the cart identifier to the first mobile terminal; and
      send the transaction identifier to the service-provider node, the transaction identifier associating the first mobile terminal with the payment associated with at least one requested service.

3. The non-transitory computer readable medium according to claim 2, wherein the communication node is further configured by the first processor to effect the payment by:
   receiving a payment authorization from the first mobile terminal to initiate the payment phase, the payment authorization including authorization data and the cart identifier;
   sending a payment request to the authorization node; and
   receiving a payment confirmation message from the authorization node, the payment confirmation message being issued in response to the payment request and indicating that payment has been effected to complete the payment phase.

4. The non-transitory computer readable medium according to claim 3, wherein the communication node is further configured by the first processor, in the delivery phase, to forward the secure content to the target entity by:
   receiving a service call from the service-provider node, the service call being issued in response to receipt of the transaction identifier provided by the communication node; and
   in response to the receipt of the service call:
      sending a first operation identifier to the first mobile terminal, the first operation identifier associating the cart identifier to the transaction identifier;
      sending a second operation identifier to the service-provider node, the second operation identifier matching the first operation identifier; and
      receiving the secure content from the service-provider node; and
   in response to receipt of the payment confirmation message completing the payment phase:
      forwarding at least one data message to the first mobile terminal associated with the target entity, the at least one data message containing the secure content.

5. The non-transitory computer readable medium according to claim 4, wherein, after having forwarded the at least one data message to the first mobile terminal, the communication node is further configured by the first processor to:
   receive at least one confirmation message from the first mobile terminal, a final one of the at least one confirmation message indicating that the forwarding of the secure content to the first mobile terminal has been completed successfully.

6. The non-transitory computer readable medium according to claim 5, wherein, after having received the final one of the at least one confirmation message, the communication node is further configured by the first processor to:
   send a general confirmation message to the service-provider node, the general confirmation message indicating that the forwarding of the secure content to the first mobile terminal has been completed successfully.

7. The non-transitory computer readable medium according to claim 6, wherein, after having sent the general confirmation message, the communication node is further configured by the first processor to:
receive a service-complete confirmation message from the service-provider node; and
in response to receipt of the service-complete confirmation message, cancel the transaction identifier assigning the service-provider node to the at least one requested service provided to the first mobile terminal.

8. The non-transitory computer readable medium according to claim 7, wherein:
the service-complete confirmation message is associated with a service result specifying an effect that the secure content has been delivered; and
the communication node is further configured by the first processor to send a message based on the service result to the first mobile terminal in response to the service result to complete the delivery phase.

9. A mobile terminal for requesting delivery of service-related secure content of a requested service to a target entity via the mobile terminal, the mobile terminal comprising:
a mobile terminal processor; and
a wireless communication link connecting the mobile terminal processor to at least one network for direct communication with a communication node, the communication node established by a first processor on a first computer connected to the at least one network, the communication node configured by the first processor to, via the wireless communication link:
establish a first communication link directly between the communication node of the first computer and the at least one network for direct communication with the mobile terminal;
establish a second communication link directly between the communication node of the first computer and a service-provider node, the service-provider node established by a second processor on a second computer connected to the at least one network, the service-provider node configured by the second processor to provide service-related secure content of the requested service by directly interacting with the communication node in a delivery phase;
establish a third communication link directly between the communication node of the first computer and an authorization node, the authorization node established by a third processor on a third computer connected to the at least one network, the authorization node configured by a third processor to effect payments and confirm completion of payment by directly interacting with the communication node in a payment phase;
wherein, after having completed a set-up phase and in parallel with the payment phase, the communication node is further configured by the first processor to initiate the delivery phase for forwarding the service-related secure content of the requested service from the service-provider node directly to the communication node, and after having completed the payment phase, from the communication node to the target entity via the mobile terminal to complete the delivery phase;
initiate, in response to user input identifying the requested service, the set-up phase wherein the communication node is further configured by the first processor to assign a transaction identifier in the service-provider node related to a payment to be received for the requested service, and to assign a cart identifier in the mobile terminal linking the requested service and the first mobile terminal to the payment to be provided for the requested service;
effect the payment of the requested service through the payment phase via the authorization node;
receive the service-related secure content of the requested service directly from the service-provider node; and
after completion of the payment phase and in the delivery phase, transfer the service-related secure content to the target entity associated with the mobile terminal;
wherein the service-related secure content is comprised of ticket data ordered from and forwarded to the mobile terminal; and
wherein the target entity is comprised of a contactless smartcard issued by a public transportation operator.

10. The mobile terminal according to claim 9, further configured by the mobile processor to include a communication module comprising at least one of:
a near-field-communication interface configured to transfer the secure content wirelessly to an external data carrier representing the target entity, and
a data interface configured to transfer the secure content to a secure element in, or physically linked to, the mobile terminal, the secure element containing the target entity.

11. The mobile terminal according to claim 9, further configured by the mobile processor to:
receive, from the first processor of the communication node, a message that is based on a service description of the requested service together with the cart identifier; and
in response to receiving the message based on the service description of the requested service, present a message on a display of the mobile terminal to notify a user that the secure content relating to the requested service is intended to be delivered to the mobile terminal.

12. The mobile terminal according to claim 9, further configured by the mobile processor to:
receive, from the first processor of the communication node, a message specifying an effect that the secure content has been delivered; and
based on the receipt of the message specifying the effect of the secure content, present a message on a display of the mobile terminal to notify a user that the target entity contains the secure content relating to the requested service.

13. A method of delivering service-related secure content of requested services to target entities, the method comprising:
establishing a first communication link with a communication node, the communication node established by a first processor on a first computer, the first communication link connecting the first computer to at least one network;
establishing a second communication link directly between the communication node of the first computer and a service-provider node, the service-provider node established by a second processor on a second computer connected to the at least one network, the service-provider node configured by the second processor to provide service-related secure content of the requested services by directly interacting with the communication node in a delivery phase;

establishing a third communication link directly between the communication node of the first computer and an authorization node, the authorization node established by a third processor on a third computer connected to the at least one network, the authorization node configured by the third processor to effect payments for the requested services and confirm completion of payment by directly interacting with the communication node in a payment phase, wherein, after having completed a set-up phase and in parallel with the payment phase, the communication node is configured by the first processor to initiate the delivery phase for forwarding of the service-related secure content of the requested services from the service-provider node directly to the communication node, and after having completed the payment phase, from the communication node to the target entities;

communicating, by the communication node, directly with a plurality of mobile terminals over the first communication link with respect to the requested services;

delivering, by the communication node after completion of the set-up phase and the payment phase, the service-related secure content of the requested services directly to the plurality of mobile terminals over the first communication link, the service-related secure content to be forwarded to target entities associated to the plurality of mobile terminals;

communicating, by the communication node, directly with the authorization node over the third communication link in relation to payments effected and confirmed for the requested services;

receiving, by the communication node, directly at least one requested service from a user of a first mobile terminal of the plurality of mobile terminals over the first communication link;

completing the set-up phase with respect to the at least one requested service received from the first mobile terminal; and in response to the payment phase associated with the at least one requested service, forwarding the service-related secure content of at least one requested service from the service-provider node directly to the communication node, and after having completed the payment phase, from the communication node to a target entity associated with the first mobile terminal;

the set-up phase comprising:
  identifying, by the first mobile terminal to the communication node, the at least one requested service;
  designating, by the communication node, the service-provider node to provide the at least one requested service to the first mobile terminal;
  assigning, by the communication node, a transaction identifier in the service-provider node related to a payment to be received for the at least one requested service; and
  assigning, by the communication node, a cart identifier in the first mobile terminal linking the at least one requested service and the first mobile terminal to the payment to be provided for the at least one requested service;

wherein the service-related secure content is comprised of ticket data ordered from and forwarded to at least one of the plurality of mobile terminals; and wherein the target entities are comprised of contactless smartcards issued by a public transportation operator.

14. The method according to claim 13, wherein the set-up phase further comprises:
  receiving, by the communication node, identification data from the first mobile terminal, the communication node configured by the first processor to use the identification data to designate the at least one requested service by a service identifier; and
  in response to receipt of the identification data, the communication node further:
    sending a service identifier to the service-provider node, the service identifier being based on the identification data;
    receiving a service description from the service-provider node, the service description being produced in response to the service identifier;
    sending a message based on the service description together with the cart identifier to the first mobile terminal; and
    sending the transaction identifier to the service-provider node, the transaction identifier associating the first mobile terminal with the payment associated with at least one requested service.

15. The method according to claim 14, wherein the payment associated with at least one requested service is effected, in the payment phase, by the communication node:
  receiving a payment authorization from the first mobile terminal, the payment authorization including authorization data and the cart identifier;
  sending a payment request to the authorization node; and
  receiving a payment confirmation message from the authorization node, the payment confirmation message being issued in response to the payment request and indicating that payment has been effected to complete the payment phase.

16. The method according to claim 15, wherein, in the delivery phase, the communication node enabling the forwarding of the secure content to the target entity comprises:
  receiving a service call from the service-provider node, the service call being issued in response to receipt of the transaction identifier provided by the communication node; and
  in response to the receipt of the service call, the communication node further:
    sending a first operation identifier to the first mobile terminal, the first operation identifier associating the cart identifier to the transaction identifier;
    sending a second operation identifier to the service-provider node, the second operation identifier matching the first operation identifier; and
    receiving the secure content from the service-provider node; and
  in response to receipt of the payment confirmation message completing the payment phase:
    forwarding at least one data message to the first mobile terminal associated with the target entity, the at least one data message containing the secure content.

17. The method according to claim 16, wherein, after having forwarded the at least one data message to the first mobile terminal, the method further comprises:
  receiving, by the communication node, at least one confirmation message from the first mobile terminal, a final one of the at least one confirmation message indicating that the forwarding of the secure content to the first mobile terminal has been completed successfully.

18. The method according to claim 17, wherein, after having received the final one of the at least one confirmation message, the method further comprises:
sending, by the communication node, a general confirmation message to the service-provider node, the general confirmation message indicating that the forwarding of the secure content to the first mobile terminal has been completed successfully.

19. The method according to claim 18, wherein, after having sent the general confirmation message, the method further comprises:
receiving, by the communication node, a service-complete confirmation message from the service-provider node; and
in response to receipt of the service-complete confirmation message, the communication node cancelling the transaction identifier assigning the service-provider node to the at least one requested service provided to the first mobile terminal.

20. The method according to claim 17, the method further comprising:
associating, by the communication node, the service-complete confirmation message with a service result, the service result specifying an effect that the secure content has been delivered; and
sending, by the communication node, a message based on the service result to the first mobile terminal in response to the service result to complete the delivery phase.

21. A non-transitory computer readable medium, having a program recorded thereon for delivering service-related secure content of requested services to target entities, the program causing a first processor to execute the steps of:
establishing a first communication link with a communication node, the communication node established by the first processor on a first computer connected to at least one network;
establishing a second communication link directly between the communication node of the first computer and a service-provider node, the service-provider node established by a second processor on a second computer connected to the at least one network, the service-provider node configured by the second processor to provide the requested services by directly interacting with the communication node in a delivery phase;
establishing a third communication link directly between the communication node of the first computer and an authorization node, the authorization node established by a third processor on a third computer connected to the at least one network, the authorization node configured by the third processor to effect payments and confirm completion of payment by directly interacting with the communication node in a payment phase, wherein, after having completed a set-up phase and in parallel with the payment phase, the communication node is configured by the first processor to initiate the delivery phase for forwarding of the service-related secure content of the requested services from the service-provider node directly to the communication node, and after having completed the payment phase, from the communication node to the target entities;
communicating, by the communication node, with a plurality of mobile terminals over the first communication link with respect to the requested services;
delivering, by the communication node at completion of the delivery phase, the service-related secure content of the requested services to the plurality of mobile terminals over the first communication link, the service-related secure content to be forwarded to target entities associated with the plurality of mobile terminals;
communicating, by the communication node, with the authorization node directly over the third communication link in relation to payments effected and confirmed for the requested services;
receiving, by the communication node, directly over the first communication link at least one service request from a user of a first mobile terminal of the plurality of mobile terminals;
completing, by the communication node, a first set-up phase with respect to the at least one service request; and
in response to a completion of the payment phase associated with the at least one requested service, forwarding, by the communication node in the delivery phase, first service-related secure content of at least one requested service received directly from the service-provider node by the communication node to a target entity associated with the first mobile terminal;
the set-up phase comprising:
identifying, by the first mobile terminal to the communication node, the at least one requested service;
designating, by the communication node, the service-provider node to provide the at least one requested service to the first mobile terminal;
assigning, by the communication node, a transaction identifier in the service-provider node related to a payment to be received for the at least one requested service; and
assigning, by the communication node, a cart identifier in the first mobile terminal linking the at least one requested service and the first mobile terminal to the payment to be provided for the at least one requested service;
wherein the service-related secure content is comprised of ticket data ordered from and forwarded to at least one of the plurality of mobile terminals; and
wherein the target entity is comprised of a contactless smartcard issued by a public transportation operator.

* * * * *

UNITED STATES PATENT AND TRADEMARK OFFICE
CERTIFICATE OF CORRECTION

PATENT NO. : 11,176,535 B2  
APPLICATION NO. : 15/300965  
DATED : November 16, 2021  
INVENTOR(S) : Mattias Eld et al.

Page 1 of 1

It is certified that error appears in the above-identified patent and that said Letters Patent is hereby corrected as shown below:

On the Title Page

Item (73):
• Please correct the Assignee's residence to: Stockholm, Sweden

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*